United States Patent
Rutkowski et al.

(10) Patent No.: US 6,988,191 B1
(45) Date of Patent: Jan. 17, 2006

(54) METHOD FOR THE SYNCHRONIZED START-UP OF A NUMERICAL CONTROL

(75) Inventors: Christian Rutkowski, Traunstein (DE); Thomas Klughammer, Chieming (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/980,303

(22) PCT Filed: May 27, 2000

(86) PCT No.: PCT/EP00/04856

§ 371 (c)(1),
(2), (4) Date: Mar. 25, 2002

(87) PCT Pub. No.: WO00/73864

PCT Pub. Date: Dec. 7, 2000

(30) Foreign Application Priority Data

May 28, 1999 (DE) .......................................... 199 24 461

(51) Int. Cl.
*G06F 9/30* (2006.01)
*G06F 13/10* (2006.01)

(52) U.S. Cl. .............................. 713/1; 713/2; 713/100; 709/222; 709/227; 370/260

(58) Field of Classification Search .................... 713/1, 713/2, 100; 709/222, 227; 703/22; 370/260; 700/2, 7, 11, 23
See application file for complete search history.

(56) References Cited

U.S. PATENT DOCUMENTS

| | | | | |
|---|---|---|---|---|
| 3,828,318 A | * | 8/1974 | Bennett et al. ............. | 700/180 |
| 4,029,950 A | * | 6/1977 | Haga ............................ | 700/7 |
| 4,129,901 A | * | 12/1978 | Masuda ....................... | 700/12 |
| 5,339,438 A | | 8/1994 | Conner et al. | |
| 5,453,933 A | | 9/1995 | Wright et al. | |
| 5,506,787 A | * | 4/1996 | Muhlfeld et al. ........... | 700/181 |
| 5,634,124 A | * | 5/1997 | Khoyi et al. ............. | 707/103 R |
| 5,844,804 A | | 12/1998 | Schussler | |
| 5,951,682 A | * | 9/1999 | Clark et al. ..................... | 713/1 |
| 5,990,638 A | * | 11/1999 | Aoyama et al. .............. | 318/85 |
| 6,004,019 A | * | 12/1999 | Suita et al. ................. | 700/212 |

FOREIGN PATENT DOCUMENTS

| | | |
|---|---|---|
| DE | 195 20 744 | 12/1996 |
| DE | 195 20 745 | 12/1996 |
| DE | 195 20 747 | 12/1996 |
| EP | 0 524 344 | 1/1993 |
| EP | 0 546 794 | 6/1993 |
| EP | 0 657 043 | 6/1995 |
| EP | 0 717 866 | 5/1997 |

OTHER PUBLICATIONS

IBM TDB, "Real-time Task Dispatcher for Multi-loop Control Systems", vol. 31, Issue 6, pp. 446–453, Nov. 1, 1988.*

* cited by examiner

*Primary Examiner*—Rehana Perveen
(74) *Attorney, Agent, or Firm*—Brinks Hofer Gilson & Lione

(57) ABSTRACT

A method for the synchronized start-up of an application of a numerical control of a mechanized element that includes sequentially performing several initialization steps for several objects of an application, wherein several first objects are hierarchically subordinated to the application, and at least one second object is hierarchically subordinated to each of the several first objects, initializing the several first objects and the at least one second object, initializing the several first objects via the application and initializing the at least one second object via the first object. Transmitting a first execution report to one of the several first objects and transmitting a second execution report to the application via the first objects.

32 Claims, 1 Drawing Sheet

METHOD FOR THE SYNCHRONIZED START-UP OF A NUMERICAL CONTROL

Applicants claim, under 35 U.S.C. §§ 120 and 365, the benefit of priority of the filing date of May 27, 2000 of a Patent Cooperation Treaty patent application, copy attached, Serial Number PCT/EP00/04856, filed on the aforementioned date, the entire contents of which are incorporated herein by reference, wherein Patent Cooperation Treaty patent application Serial Number PCT/EP00/04856 was not published under PCT Article 21(2) in English.

Applicants claim, under 35 U.S.C. § 119, the benefit of priority of the filing date of May 28, 1999 of a German patent application, copy attached, Serial Number 199 24 461.8, filed on the aforementioned date, the entire contents of which are incorporated herein by reference.

BACKGROUND OF THE INVENTION

1. Field of the Invention

The present invention relates to a method for the synchronized start-up of a numerical control.

2. Description of the Related Art

EP 0 524 344 B1 discloses a configurable machine tool control having several task-oriented units, for example a numeric and a memory-programmable control element, an operating unit and a communications area with a network interface. Furthermore, at least one functional object is provided, which is implemented by software or by software and hardware, and is capable of performing a function. This functional object is subdivided into a procedural element, and a communications element and possibly an operating element. In addition, at least one object manager is provided, which manages at least two functional objects, and in particular synchronizes their information exchange. This control structure is implemented by at least one data processing system, which processes the data from the functional objects and the object manager and which itself is designed as a task-oriented unit.

No systematic process for starting a control implemented as a task-oriented unit is known from EP 0 524 344 B1. Note that EP 0 524 344 B1 corresponds to U.S. Pat. No. 5,844,804, the entire contents of which are incorporated herein by reference.

An object-oriented control for machine tools is known from EP 0 657 043 B1, wherein a number of objects is formed from classes of objects. Starting from the structure of a control disclosed in EP 0 524 344 B1, the definitely required classes of objects and the objects which are needed for implementing a conventional functionality of a control, are disclosed in EP 0 657 043 B1. Among these are, for example, classes of objects for types of processing, geometry, kinematics and technological data, as well as types of control data and an object class of sequencing control. Any arbitrary number of objects can be formed from each class of objects, each of which contains its own data range, a messenger mechanism for communications with other objects and a procedural part for executing methods for processing, kinematics, geometry or technology. The user input is interpreted by the sequence control and leads to the activation of the selected objects. The selected objects communicate with each other and by this network-like linkage form a functional unit of the control which is capable of running.

No systematic process for starting a numerical control is known from EP 0 657 043 B1, either. Note that EP 0 657 043 B1 corresponds to U.S. Pat. No. 5,506,787, the entire contents of which are incorporated herein by reference.

A CNC control system is known from EP 0 717 866 B1, which contains an object-oriented program in which objects exchange object-oriented information. The objects are divided into classes in the object-oriented program, for example a process class, which contains objects for work processes such as drilling, thread-cutting, reaming etch., which are performed by machine components. Here, a class always contains similar objects, i.e. objects which agree in their basic structure. Based on the uniform basic structure of the objects in a class there is the possibility that, in the course of creating new objects, selected properties of the respective class are passed on to the new object. For example, a drilling object has depth and a diameter, which can be inherited by another object of the process class, for example a thread-cutting object which also has depth and a diameter. Another object class has machine components, such as a spindle, shafts, a turntable, etc., for example. Moreover, object classes are provided for the kernel, with a motion and a logic controller as objects, for platform services, the operating system and the device drivers. During operation of the control it is necessary for messages to be exchanged between the individual objects. For example, in a drilling process a message regarding the number of revolutions of the drill is transmitted from the drill object to the object called spindle, furthermore messages regarding the position of the hole are transmitted to the objects of participating shafts, etc. Here, a standard interface is provided for the messages, so that they have a universal structure and can be designed independently of the involved objects. This standard interface for message exchanges between objects is implemented in connection with an object receiving or transmitting messages regarding the movement by a software kernel, which is intended to operate in real time and receives and transmits messages.

A method for a synchronized start-up of a numerical control is not disclosed in EP 0 717 866 B1. Note that EP 0 717 866 B1 corresponds to U.S. Pat. No. 5,453,933, the entire contents of which are incorporated herein by reference.

A system of several object manager components is described in DE 195 20 747 A1, on which object managers have been locally installed, which are to be initialized in several phases. Initialization takes place in several steps, wherein a new step is only started after the preceding step has been executed.

A method for a synchronized start-up of a numerical control with hierarchically arranged objects is not disclosed in DE 195 20 747 A1. Instead, DE 195 20 747 A1 describes a system of several object manager components, wherein object managers, which are to be initialized in several phases, are locally installed. Initialization takes place in several steps, wherein a new step is only permitted after the previous step has been executed.

SUMMARY AND OBJECTS OF THE INVENTION

It is therefore an object of the present invention to cite a method for a start of an application of a numerical control wherein their processes, threads and modules are embedded into a structure and are initialized in a synchronized manner, and wherein thereafter a transition to a normal operation is made. It is intended to assure that in the course of transitioning to normal operations the communications channels, by modules, which are parts of different threads or processes, communicate with each other, are provided in particular.

This object is attained by a method for the synchronized start-up of an application of a numerical control of a mechanized element that includes sequentially performing several initialization steps for several objects of an application, wherein several first objects are hierarchically subordinated to the application, and at least one second object is hierarchically subordinated to each of the several first objects, initializing the several first objects and the at least one second object, initializing the several first objects via the application and initializing the at least one second object via the first object. Transmitting a first execution report to one of the several first objects and transmitting a second execution report to the application via the first objects.

In accordance with the present invention, execution messages regarding the performed initialization steps of the individual objects are passed on to the respectively hierarchically higher objects. This so-called looping of the execution messages has the advantage that a subordinated object only needs to communicate with the object that has created it. In other words, the created object does not need to know its larger surroundings or environment. Because of this, it is particularly simple to change the object structure, in particular to complement it. During the start-up process, the object is almost immediately aware in which branch an error has occurred. It is therefore not absolutely necessary that the application know the entire structure in its hierarchical design.

The method in accordance with the present invention has the advantage that the software of a numerical control for a machine tool in the form of an application with the associated processes, threads and modules is started in a synchronized manner up to the operational readiness of the control. Here, in a first step the application is loaded into the main memory in the form of one or several executable files, and the individual objects, for example processes, threads and modules, are created. As soon as all objects have been created, the objects are initialized, for example with parameter values, in a second step. As soon as this initializing step is completed, further initializing steps can follow until, in a last initializing step, the entire application is released for operation. Thus, all applications, processes, threads and modules have been created, initialized and the control is ready for operation in an error-free start-up. If errors should occur in an object, following such a synchronized start-up it is known which processes, threads or modules are wrong. A further advantage lies in that, if this does not hold true in connection with a required application, a process, a thread or a module, the user is informed.

The present invention will be explained in greater detail in what follows by drawings. Shown are in:

The paragraph invention is intended to be explained in what follows by a simple numerical control for a machine tool.

DESCRIPTION OF THE PREFERRED
EMBODIMENT(S) OF THE INVENTION

Figure 1:
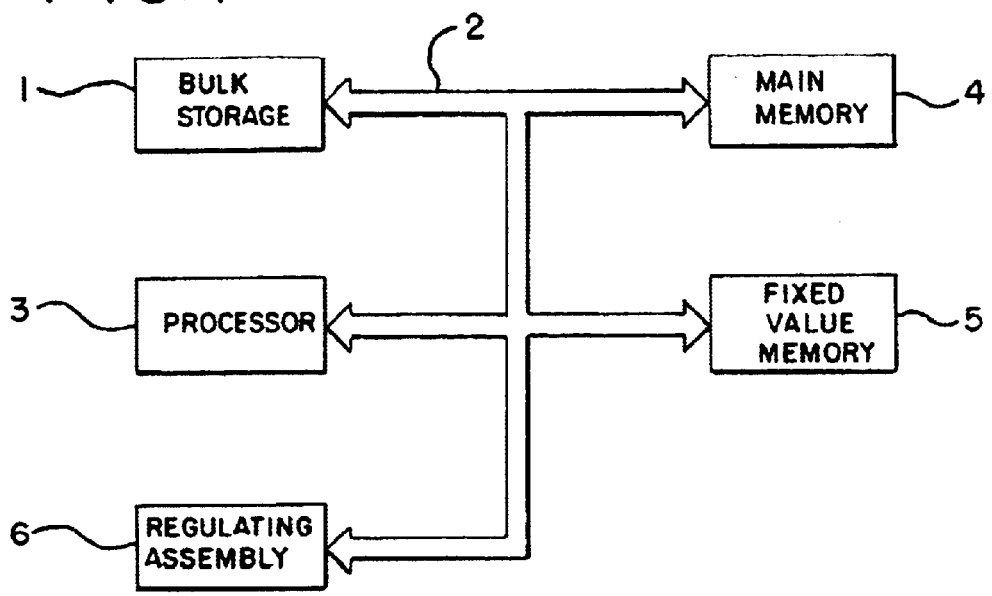
FIG. 1 schematically shows an embodiment of circuit in accordance with the present invention.

In accordance with FIG. 1, the control arrangement has at least one bulk storage 1, which is connected with a processor 3 via a bidirectional bus 2. In this way the processor 3 can have a read and write access to the bulk storage 1. The bulk storage 1 can be implemented by a magnetic or optical memory or a combination of several different memories. The bulk storage 1 can have exchangeable storage media, for example compact disks. Via the bus 2, a bidirectional connection also exists with a main memory 4, which is designed as a write/read memory and has a shorter access time than the bulk storage 1. The main memory 4 can also be designed—at least partially—integrated into the processor 3. A bidirectional connection furthermore exists via the bus 2 with a fixed value memory 5 which, in contrast to the main memory 4, only has a small memory capacity and is designed as a read/write memory. A regulating assembly 6 is furthermore connected with the bus, by which the drive motors for the shafts and the spindle are connected in turn.

So that the processor 3 can control the various functions of the machine tool, it is necessary to make the software of a numerical control for the machine tool available in the main memory 4, which is identified as application 10 in what follows and is processed by the processor 3. Since as a rule the main memory 4 is not a permanent memory, an executable file is stored in the bulk storage 1, which permits the creation of the entire application 10 in the main memory 4 by the processor 3 as soon as the control arrangement has been connected to the supply voltage. The creation of the application 10 from the file stored in the bulk storage 1 is called initialization in what follows and usually takes place in several steps.

First, a start program is executed, which contains information regarding the application 10 and the chronological sequence of the individual initialization steps, and which loads at least a part of the data of the application 10 from the bulk storage 1 into the main memory 4. The structure of the application 10 is created at the start of initialization. In the process, the data of the at least one file stored in the bulk storage 1 and being part of the application 10 are transferred into the main memory 4 and are processed. Objects 11 to 21, which are linked to each other, are created during processing.

Figure 2:
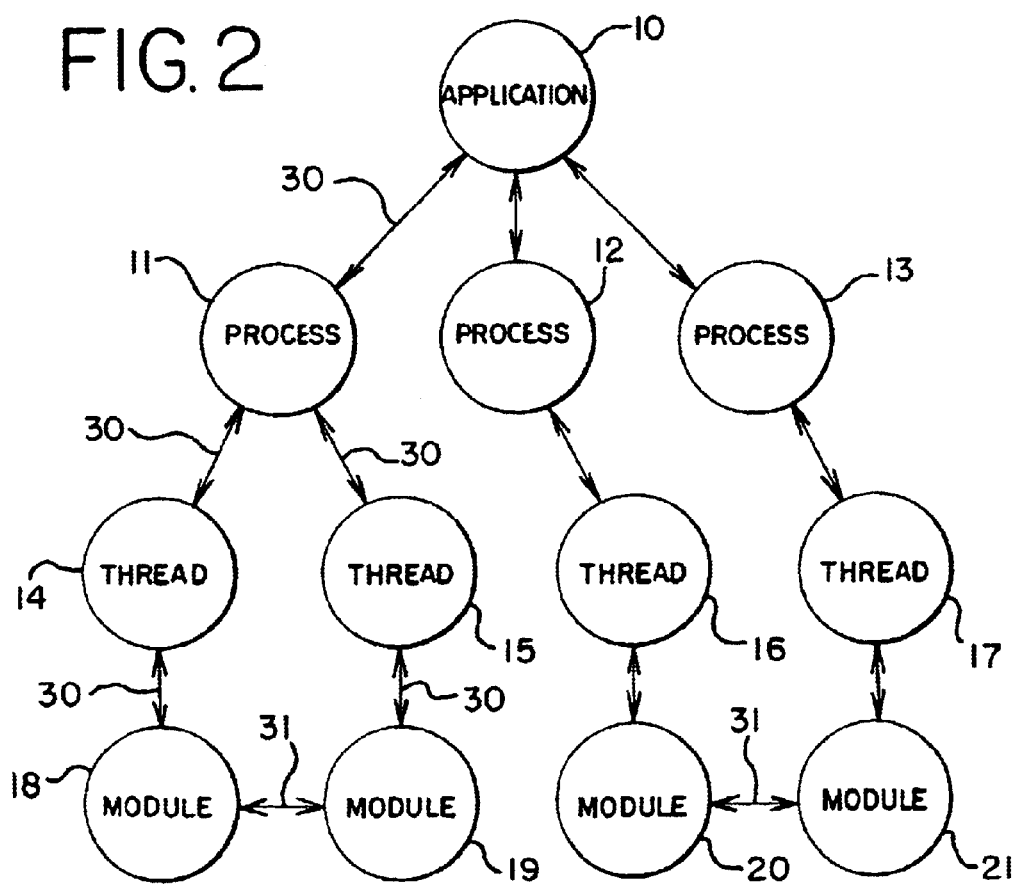
FIG. 2 schematically shows an embodiment of a structure of an application implemented by the circuit of FIG. 1 according to the present invention.

In accordance with FIG. 2, an application 10 is subdivided into several processes 11 to 13, wherein each process 11 to 13 advantageously has its own address space in the main memory 4. However, several or all processes 11 to 13 can share a common address space. Each process 11 to 13 is subdivided into threads 14, 15, 16, 17 and has at least one thread 14, 15, 16, 17. The code processed in the threads 14 to 17 is divided into modules 18 to 21, a part of each of which is a defined data structure and in which at least one defined function of the control is implemented, for example to machine a pocket or to cut a thread, etc. The modules 18 to 21, threads 14 to 17 and processes 11 to 13, which are part of the application 10, are linked to each other in such a way that they can also exchange data past the limits of threads 14 to 17 and processes 11 to 13.

As already explained, the software of the numerical control of the machine tool is called application 10, it has the function of the machine control or the function of a programming location. The processes 11 to 13, which are subordinated to the application 10, for example, have the function of interpolation, of the stored program programmable control SPS, or of the advance geometry calculation. The threads 14 to 17 subordinated to the processes 11 to 13 have the function of making central processing unit (CPU) time available to the processes 11 to 13, i.e. to distribute the CPU time. CPU time and data are required for an application 10, the data are made available in the form of memory space by the processes 11 to 13, and the CPU time by the associated thread 14 to 17. The modules 18 to 21 subordinated to the threads 14 to 17 divide a process 11 into logical sections, for example a coordinate transformation, from a logical viewpoint.

In order to implement such a structure of the application 10 in a particularly simple form in accordance with program technology, an object-oriented programming language is advantageously selected. By the object-oriented programming language the application 10, each process 11 to 13, each thread 14 to 17 and each module 18 to 21 are designed as an object. The objects 10 to 21 can be synchronized, can create further objects 11 to 21, and can manage the created objects 11 to 21. Such a structure, and the mentioned functions, can basically also be implemented by a non-object-oriented programming language.

When the control arrangement is connected with the current supply, first its operating system software is loaded into the main memory 4 of the control arrangement, and subsequently the start program of the application 10. Thereafter this start program is executed and controls the synchronized creation of at least the further processes 11 to 13. It is also alternatively possible to control the creation of the entire structure 10 to 21 by the start program.

The data required by the start program are stored in a separate file, which must be read in, or directly in the start program itself. If these data are stored in a separate file, the start program also loads this file into the main memory 4 and evaluates it. The data identify at least one executable file, which is stored in the bulk storage 1 and is to be loaded, for a process 11 to 13 of the application 10, and optionally transfer parameters of the processes 11 to 13, information for synchronizing the processes 11 to 13, and information regarding the initializing steps to be performed during initialization. These executable files defined in this manner are loaded by the start program into the main memory 4 of the control and are evaluated. The processes 11 to 13 can be subsequently created.

Thus, in the course of processing the start program for the synchronized start-up of the control, the files required for the application 10 are sequentially loaded into the main memory 4. Thereafter the processes 11 to 13, which constitute the application 10, are created, then the threads 14 to 17, and finally the data structures which are a part of the modules 18 to 21. In this case further data are needed for creating the threads 14 to 17, which are a part of each process 11 to 13, and for the modules 18 to 21, which are a part of every thread 14 to 17. The data for creating the threads 14 to 17 can be stored in the start program, or in a file read in by the start program, in an executable file of the processes 11 to 13, or in a respectively read-in file.

This applies correspondingly also to the modules 18 to 21. Here, too, the data needed for their creation can be stored in the start program, or in a file read in by the start program, in an executable file, or in an individual file. Based on data regarding a module 18 to 21, the thread 14 to 17 as a part of the respective module 18 to 21 creates this module 18 to 21.

This results in a tree-like structure of the objects 10 to 21, at whose tip the application 10 is located on the highest hierarchical level. The application 10 is subdivided into processes 11 to 13, which in turn includes threads 14 to 17. The modules 18 to 21, which are assigned to the threads 14 to 17, are located on the lowest hierarchical level.

The linkage between the modules 18 to 21, the threads 14 to 17 and the processes 11 to 13, up to the application 10 is implemented by communications channels 30. Since the modules each have a defined functionality, defined communications channels 31 are required for each module 18 to 21, through which the data are transmitted from or to another module 10 to 21.

In an embodiment in accordance with the present invention, each object 10 and 21 has, inter alia, a program element which is used for initializing this object 10 to 21 and which executes individual steps for initializing each object 10 to 21. These individual steps include the object 10 to 21 initiates the initialization of objects 11 to 21, which are hierarchically subordinate to it, waits for the execution report of all subordinate objects 11 to 21 and then, following its own correct initialization, forwards an execution report to the higher-ranking object 10 to 21. Further initializing steps can additionally take place by the program element.

This assignment of program elements can be implemented in a particularly advantageous manner by an object-oriented programming language.

As soon as a module 18 to 21 has been correctly created and has been inserted into the object-oriented structure, the module 18 to 21 sends an execution report back to the hierarchical thread 14 to 17, which is higher-ranking than it and which has created the module 18 to 21. From this the thread 14 to 17 determines that the module 18 to 21 has been created without errors. As soon as the thread 14 to 17 has received the execution report from each module 18 to 21 which it had created, and the thread 14 to 17 itself has also been created without errors, it also sends an execution report to the process 11 to 13 which is higher-ranking than it. As soon as each process 11 to 13 in turn has received an execution report of the correct creation from all threads 14 to 17 created by it, and the process 11 to 13 has also been correctly created the process 11 to 13 sends an execution report to the higher-ranking application 10. In the represented example, only one module 18 to 21 each has been assigned to each thread 14 to 17A but several modules can also be assigned to each thread 14 to 17.

As soon as the application 10 has determined the correct creation of all processes 11 to 13 created by it on the basis of the received execution reports, the next step of the initialization takes place. All already created objects 11 to 21 must wait until then, so that no overlaps occur, for example because a first object tries to communicate with a second object, although the second object had not yet been created. The synchronization of the initialization is achieved by this waiting period, since all objects 11 to 21 are in a defined state at a defined time. Mechanisms, such as semaphores and barriers, or the like, are available for implementing this waiting period in a typical multi-tasking operating system.

In a second step of the initialization, the communications channels 30, 31 between the objects 10 to 21 are established. By causing the execution of the program element for the initialization of the communication channels 30 provided in the respective process 11 to 13, the communications channels 30 of one process 11 to 13 are established. This is also continued, corresponding to the manner already described in connection with the creation of the structure, for the threads 14 to 17 and modules 18 to 21, until all modules 18 to 21 have created their communications channels 30, 31.

Following the successful creation of all communications channels 30, 31 by a module 18 to 21, the latter returns an execution report to the thread 14 to 17 which initiated this. As soon as a thread 14 to 17 has received an execution report from all assigned modules 18 to 21, and also has itself successfully created all communications channels 30, the thread 14 to 17 also sends an execution report to the higher-ranking process 11 to 13. Once a process 11 to 13 has received an execution report from all assigned threads 14 to 17, and also has itself correctly created all communications channels 30, it sends an execution report to the higher-ranking application 10. As soon as the application 10 has received an execution report from all assigned processes 11 to 13, this second step of the initialization is also completed.

Since it is necessary to exchange the most varied data as rapidly as possible between the objects 10 to 21 during the operation of the control, the communications channels can be differently implemented in accordance with the requirements. For example, a communications channel between two modules 18 to 21 of the same thread 14 to 17 can be implemented in the form of a memory common to both modules 18 to 21, through which data are exchanged; a communications channel 31 between modules 18 to 21 in different processes 11 to 13 must be able to transmit data from one address space to another.

The possibility of performing further initializing steps exists, which basically run identically to the ones described so far. The execution of a program element for creating a defined function is always triggered by the hierarchically higher-ranking objects 10 to 17, and thereafter a waiting period takes place until an execution report is received from all subordinated objects 11 to 21, before an execution report is transmitted to a higher-ranking object 10 to 17. The next step of the initialization takes place only after the application 10 has received the execution reports from all assigned processes 11 to 13. By this it is assured that the initialization takes place synchronously and that all objects 10 to 21 assume a defined state at a defined time.

For example, parameters can be transmitted to individual objects 10 to 21 in these further initializing steps. The basic operation takes place as has already been described for the previous initializing step.

Starting of the application 10 takes place as the last initialization step. In the course of this, each object 10 to 21 is given a signal that the initialization has been completed and the regular operation of the control starts from here. From this an object 10 to 21 recognizes that it is to perform the regular processing of data received through the communications channels. No execution report to the higher-ranking object 10 to 17 is absolutely required in this last step, since the correct initialization has already been signaled by the previous execution reports, and the synchronicity required for initialization is no longer needed.

A simple example of an initialization is represented in FIG. 2. Here, first the loading program for loading the start program is executed, so that the start program is in the main memory 4. If the data are not already contained in the start program, a file is subsequently loaded by the start program, which contains information regarding the technical program structure of the entire application 10, as well as regarding one or several files in which the entire application 10 has been stored in the bulk storage 10. This information is employed by the start program in such a way that all files containing information regarding the application 10 are loaded into the main memory 4 and the application 10 is created by the start program.

It is known to the application 10 created in this way that the processes 11, 12 and 13 are assigned to the application 10. Therefore the structure of the processes 11, 12 and 13 is created by the application 10. This is accomplished in that the application 10 loads at least one executable file into the main memory 4 and starts the execution of this at least one file. All processes 11, 12 and 13 are created in this way.

The newly created processes 11, 12 and 13 contain information regarding which threads 14 to 17 are assigned to the respective process 11, 12 and 13, so that the creation of the threads 14, 15, 16 and 17 is initiated by the processes 11 to 13.

In turn, the threads 14 to 17 contain information as to whether further modules 18 to 21 have been assigned to them. The modules 18 to 21 are created in this way. The modules 18 to 21 constitute the lowest hierarchical level in the control software of the machine tool, so that they do not contain any further information regarding assigned objects.

Which further objects 11 to 21 are assigned to each object 10 to 17 is stored in the latter, for example, the fact that process objects 11, 12 and 13 are assigned to the application object 10 is stored in the latter, that thread objects 14 and 15 are assigned to the process object 11 is stored in it, etc. It is furthermore stored in each object 11 to 21 by which object 10 to 17 it had been created, i.e. the information, that they had been created by the process object 11 is stored in the two thread objects 14 and 15. Exceptions are the application object 10, in which no information as to which object had created it is stored, and the module objects 18 to 21, to which no further objects are assigned.

After the entire software of the control has been created in a synchronized manner, an execution report is yet issued by the created objects 11 to 21 to the objects 10 to 17, which had created them, that the creation was successful. This starts with the last created module objects 18 to 21 which, following a successful creation, transmit an execution report to the thread objects 14 to 17 which are higher-ranking than they. This execution report signals the successful creation of the module objects 18 to 21, which they had created, to each thread object 14 to 17 and is only transmitted by the module objects if the creation of the module objects 18 to 21 really had been successful.

Once a thread object 14 to 17 has received an execution report regarding the successful creation of all module objects 18 to 21 assigned to it, and itself has also been created without errors, it also sends an execution report to the process object 11 to 13 which has created the thread object 14 to 17. This means that the thread objects 14 and 15 transmit the execution report to the process object 11 which already waits for it. As soon as a completed creation has been reported to the process object 11 by the thread objects 14 and 15, which had been created by it, the process object 11 also reports a completed creation to the application object 10. In the same way the thread object 17 reports a completed creation to the process object 13 which thereafter reports a completed creation to the application object 10 in turn.

After the application object 10 has been informed by all process objects 11, 12 and 13, which it had created, that the structure was complete, the structure implemented by the application object 10 is available to the control. The first step of the synchronized start-up of the control is therefore completed.

If an object cannot be created, so that an error exists, this object does not send a report that the creation had been successfully completed. Following a defined waiting period, the hierarchically higher-ranking object determines that the start-up could not have been successfully executed and also does not send an execution report to the object which is higher-making. The corresponding function then is not available in the application 10. It is possible to determine at which location a creation had not been possible, based on execution reports which had not been received by the respectively higher-ranking objects.

Now the initialization of the communications channels 30, 31 between the objects 10 to 21 follows and proceeds in accordance with the same system as the creation of the structure 10 to 21 of the software. In the process, at least logical communication channels 30, 31 are defined for the application object 10 and each process object, thread object and module object 11 to 21, by which they can communicate with already created objects. In this case a communications channel 30, 31 can also be considered to be an object. For the creation of the communications channels 30, 31, information regarding the further objects with which messages are to be exchanged is already stored in the application object, the process object, thread object and module object 11 to 21. Communications channels 30, 31 to these objects are then created.

After the structure 10 to 21 and the communications channels 30, 31 have been synchronously created, the synchronized initialization of the application takes place, for example with start values or adjustable parameters. This takes place in accordance with the same system as already described for the first step.

For ending the synchronized start-up, all objects 10 to 21 are informed of the transition to normal operations in accordance with this pattern. This also takes place in accordance with the same system already described above.

It is obvious to one skilled in the art that the distribution of the information to one or several files can take place arbitrarily. There is the option of storing the required information on only a few files. For example, the start program can already contain extensive information regarding the entire structure to be created. Alternatively it is also possible to provide many small files, each of which contains only a small portion of the information required for initialization. Moreover, it is possible in connection with the synchronized start-up to pass through steps in addition to the creation of the structure, the communications channels, the initialization and the transition to normal operations, in particular as a function of the machine tool to be controlled by the application 10.

The start-up described by way of example can be summed up as a whole as follows. In order to assure simple maintenance and extensibility, the programs for numerical control increasingly have an object-oriented structure. In this case the applications 10, the processes 11 to 13, the threads 14 to 17 and the modules 18 to 21 are each represented by an object 10 to 21.

In the process, each object 10 to 21 sequentially assumes a number of defined states, such as object created, object initialized, start-up completed. Starting with the application object 10, first the processes 11 to 13, which are required for the application 10, are created, which hierarchically create further threads 14 to 17 necessary for the respective process 11 to 13, and the threads 14 to 17 in turn each create the required modules 18 to 21. In the process, each object 10 to 21 assumes a defined state as soon as it itself has been completely created and when all objects 11 to 21 created by it have been completely created, and reports this to the creating object 10 to 17. When this confirmation arrives at the application object 10, it assumes the same state and triggers the next step of the start-up. In the process, each object 10 to 21 triggers the action in all objects 11 to 21 created by it and assumes the next defined state after it has completely performed the action, and when all objects 11 to 21 created by it have completely performed the action, and reports this to the creating object 10 to 17. All defined states are analogously passed sequentially in steps until normal operation has been achieved and the start-up is completed.

Advantageously the individual steps sequentially includes the creation of the process 11 to 13, of the threads 14 to 17 and of the modules 18 to 21, until all required objects 11 to 21 have been created, thereafter the creation of the communications channels 30, 31 by the respective receiver, the opening of the communications channels by the transmitter, the parameterization of the modules 18 to 21 and the transition to normal operations of the numerical control.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A method for the synchronized start-up of an application of a numerical control of a mechanized element, the method comprising:
    sequentially performing several initialization steps for several objects of an application, wherein several first objects are hierarchically subordinated to said application, and at least one second object is hierarchically subordinated to each of said several first objects;
    performing one of said initialization steps in said several first objects and said at least one second object;
    performing one of said initialization steps in said several first objects via said application;
    performing one of said initialization steps in said at least one second object via at least one of said several first objects;
    transmitting a first execution report to one of said several first objects; and
    transmitting a second execution report to said application via said several first objects.

2. The method of claim 1, wherein said transmitting said first execution report occurs following correct execution of said performing one of said initialization steps in said at least one second object.

3. The method of claim 1, wherein said transmitting said second execution report occurs following correct execution of said performing one of said initialization steps in said several first objects.

4. The method of claim 2, wherein said transmitting said second execution report occurs following correct execution of said performing one of said initialization steps in said several first objects.

5. The method of claim 1, wherein said mechanized element comprises a machine tool.

6. The method of claim 1, wherein said mechanized element comprises a robot.

7. The method of claim 1, further comprising executing a starting program.

8. The method of claim 7, wherein said executing said starting program comprises loading at least a part of data of said application into a memory.

9. The method of claim 7, wherein said starting program comprises information regarding said application and a chronological sequence of said several initialization steps.

10. The method of claim 1, wherein a step involved in said performing one of said initialization steps in said several first objects is stored in one of said several first objects.

11. The method of claim 1, wherein a step involved in said performing one of said initialization steps in said at least one second object is stored in said at least one second object.

12. The method of claim 10, wherein a step involved in said performing one of said initialization steps in said at least one second object is stored in said at least one second object.

13. The method of claim 1, further comprising initializing a third object that is hierarchically subordinated to said at least one second objects wherein said at least one second object initiates said initializing said third object.

14. The method of claim 13, further comprising:
transmitting a third execution message to said at least one second object via said third object; and
transmitting a fourth execution message to said several first objects via said at least one second object.

15. The method of claim 1, wherein said several first objects are processes of said application.

16. The method of claim 1, wherein said at least one second object is a thread that makes central processor unit time available.

17. The method of claim 15, wherein said at least one second object is a thread that makes central processor unit time available.

18. The method of claim 14, wherein said several first objects are processes of said application and said at least one second object is a thread that makes central processor unit time available.

19. The method of claim 1, further comprising implementing a definite function of a numeric control in each of said several first objects.

20. The method of claim 18, further comprising implementing a definite function of a numeric control in each of said several first objects.

21. The method of claim 1, further comprising creating individual, essentially completed functions of said application in the form of said several first objects.

22. The method of claim 1, further comprising creating individual, essentially completed functions of said application in the form of said at least one second object.

23. The method of claim 1, further comprising creating communications channels between said several first objects and said at least one second object.

24. The method of claim 1, further comprising assigning a parameter to a variable in said several first objects.

25. The method of claim 1, further comprising assigning a parameter to a variable in said at least one second object.

26. The method of claim 1, further comprising releasing a regular operation of said application.

27. A method for the synchronized start-up of an application of a numerical control of a mechanized element, the method comprising:

sequentially performing several initialization steps for several objects of an application, wherein several first objects are hierarchically subordinated to said application, and at least one second object is hierarchically subordinated to each of said several first objects;
performing one of said initialization steps in said several first objects via said application;
performing said one of said initialization steps in said at least one second object via at least one of said several first objects;
transmitting a first execution report via said initialized at least one second object to one of said several first objects;
transmitting a second execution report to said application via said initialized several first objects that have received said first execution report; and
further initializing said several first objects and said at least one second object via said application after said application receives said second execution report and after said performing said one of said initialization steps in said several first objects and said at least one second object.

28. The method of claim 27, wherein said mechanized element comprises a machine tool.

29. The method of claim 27, wherein said mechanized element comprises a robot.

30. The method of claim 27, further comprising performing, via said at least one second object, said one of said initialization steps in a third object that is hierarchically subordinated to said at least one second object;
transmitting a third execution message to said at least one second object via said third object; and
transmitting a fourth execution message to said several first objects via said second object after said third object receives said third execution message and after said initializing said third object.

31. The method of claim 30, wherein said several first objects are processes of said application and said at least one second object is a thread that makes central processor unit time available.

32. The method of claim 27, further comprising creating communications channels between said several first objects and said at least one second object.

* * * * *

UNITED STATES PATENT AND TRADEMARK OFFICE
CERTIFICATE OF CORRECTION

PATENT NO. : 6,988,191 B1
APPLICATION NO. : 09/980303
DATED : January 17, 2006
INVENTOR(S) : Christian Rutkowski et al.

It is certified that error appears in the above-identified patent and that said Letters Patent is hereby corrected as shown below:

In the Claims

Column 11, in claim 13, line 3, replace "objects" with --object,--.

Signed and Sealed this

Thirtieth Day of January, 2007

JON W. DUDAS
*Director of the United States Patent and Trademark Office*